Patented Oct. 18, 1927.

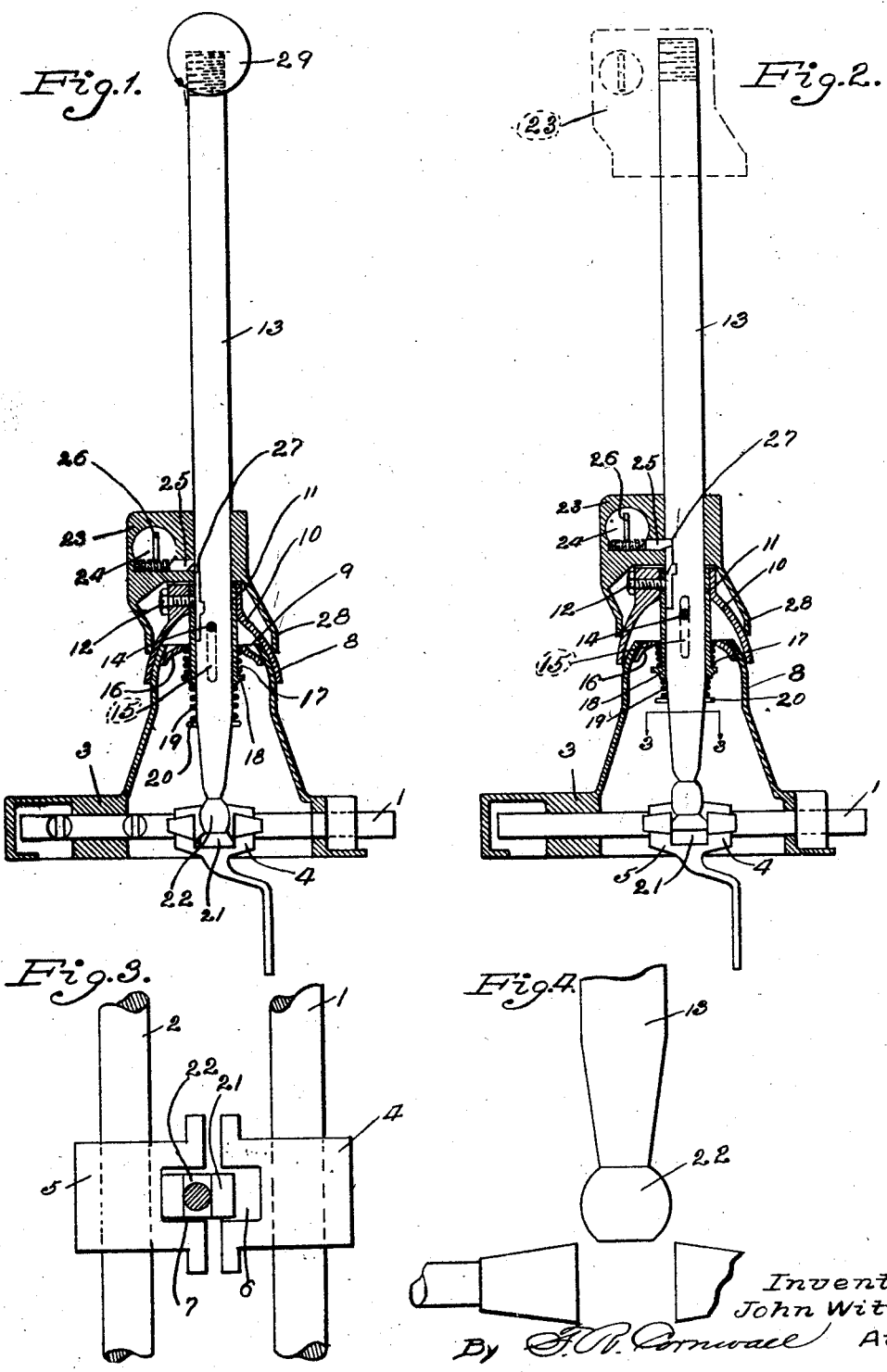

1,646,076

UNITED STATES PATENT OFFICE.

JOHN WITTE, OF FERGUSON, MISSOURI.

GEAR-SHIFT LOCK.

Application filed March 9, 1922. Serial No. 542,273.

My invention relates to gear shifts for motor cars and comprises a gear shift lever lock of the general type, shown in Noser Patent No. 1,313,412.

One object of my invention is to provide a device which will lock the lever automatically upon upward movement of the latter.

Another object of my invention is to provide a lock which will enable the lock, or lever, or both, to be removed from the gear shift housing, when desired, although necessarily preventing such removal by one not in possession of the lock key.

An additional object of my invention is to provide a lockable shift lever which may be substituted for the shift levers in a certain type of gear shift assembly now on the market, but not adapted to be provided with a lock such as shown in the above-mentioned patent.

In the accompanying drawings which illustrate a selected embodiment of my invention,—

Figure 1 is a vertical section through a gear shift mechanism to which my invention has been applied and showing the gear shift lever in operating position and unlocked.

Figure 2 is a similar section showing the lever in locked position.

Figure 3 is a horizontal section taken on line 3—3 of Figure 2.

Figure 4 shows a modified form of gear shift lever.

The gear shift rods 1 and 2 are slidably mounted in the gear shift housing 3 and fixedly carry lever lugs 4 and 5, respectively, which are provided with opposing recesses 6 and 7 adapted to be aligned transversely of the rods when the gears are in neutral position. The upper portion of housing 3 has a hollow spherical shape, the wall 8 of which is provided with a substantially horizontal opening 9. Seated on the exterior of wall 8 is a correspondingly shaped bearing cap 10 provided with a cylindrical bushing 11 which is secured to the cap by a set screw 12.

The gear shift lever 13 is slidingly fitted in bushing 11 and its sliding movement therein is limited by means of a horizontal pin 14 extending through the lever and having its ends in a vertical slot 15 in bushing 11. A washer 16 has a bearing against the upper interior of wall 8 and forms a seat for a compressed coil spring 17, the lower end of which bears against a shoulder 18 on bushing 11. A second coil spring 19 is seated against the lower face of shoulder 18 and thrusts lever 13 downwardly through its engagement with a pin 20 extending through the lever. These parts provide lever 13 with a pivotal and sliding mounting on housing 3 and it will be understood that the pivotal mounting is for the usual purpose of permitting engagement of the lower portion of the lever with either one of the lugs 4 or 5 and movement of the engaged lug forwardly or backwardly, as desired. The sliding mounting of the lever is for the purpose of locking the same out of operative position as will be described.

The lower portion 22 of the lever, normally abreast of the shafts 1 and 2, is reduced as shown, to permit its entry into either slot 6 or 7 and corresponding engagement of one of the lugs only. Below portion 22 the lever terminates in a relatively enlarged portion 21 which, when the lever is raised to an abnormal locking position, will enter both recesses 6 and 7 at the same time and prevent their relative movement.

To hold the lever in raised locking position against the downward thrust of spring 19 is the function of the lock 23. This lock consists of a casing, preferably of tool steel, in which a rotatable cylinder 24 is inserted and a sliding bolt 25 is assembled cooperatively with cylinder 24 and adapted to be operated with the latter by a key to be inserted in slot 26. Bolt 25 is spring-pressed against the face of lever 13 which is notched at 27 to engage the bolt when the lever is raised to the position shown in Figure 2.

The lower portion of the lock casing is provided with a depending skirt 28, the lower edge of which seats the casing on cap 10 and provides a cover for set screw 12, whereby the lever is assemled in its mounting elements. Obviously, this skirt on the lock case prevents access to the shift lever mounting and insures against theft, although when the bolt is retracted by a proper key, the lock may be slid upwardly on the shaft to permit access to screw 12.

The upper end of lever 13 is preferably provided with a ball 29 which is screwed on to the lever and when removed, permits the removal of lock 23 as indicated in dotted lines at the top of Figure 2.

In neutral operating position, the lock casing does not function to support the lever and the weight of the latter tends to hold the same in its operating position, irrespective of spring 19, although the presence of the latter and spring 17 are desirable to prevent jarring of the lever or chattering of the parts in contact with wall 8.

When the driver is leaving the car and desires to lock the gear shift, he merely grasps the lever and raises it about half an inch, which permits bolt 25 to engage notch 27 in the lever, thereby holding the lug engaging end of the lever above recesses 6 and 7.

While the provision of the enlarged terminal 21 illustrated in the drawings is advantageous, it is not necessary, as its elimination would not affect the security of the lock, such an arrangement being shown in Figure 4 and being just as effective, but when the lever is unlocked, the driver must position the lever so that it will enter notches 6 and 7. With the arrangement shown in Figure 4 it would be possible to lock the gears in high, intermediate, low, or reverse, if desired. This would be impossible with the preferred construction containing the terminal 21.

The breaking of either of the springs shown in the device would not interfere with the operation of the shift lever as would be the case in the above-mentioned patent, the only possible result being a rattle caused by the free play of the interengaged parts. The breaking of any of the parts of the lever or lock is a far less serious matter in my improved lock than in the lock described for the above-mentioned reason that the lever mounting elements and the lock case may be easily removed to permit repair of the damaged parts.

What I claim is:

1. In a gear shift device, a stationary pivot, a gear shift lever slidably mounted on said pivot, an element slidingly mounted on said lever and adapted to engage said lever at different points on its length.

2. A gear shift lock comprising a fixed element, an axially slidable shift lever carried by said element, and a lever locking member slidable axially on said lever and adapted to engage said lever and said element to hold them in a certain relative position.

3. The combination with a gear shift lever, of a pivotal mounting for said lever which permits the lever to move axially thereon to and from a gear shifting position, and lever locking means slidably mounted on said lever to move axially thereof and adapted to engage the lever when the latter is moved from the gear shifting position.

4. The combination of gear shifting elements, a fixed housing, an element engaging shifting lever pivotally mounted on said housing, slidable upwardly to disengage from said elements, and provided with a lateral notch, a spring compressed between said housing and lever, thrusting the latter downwardly into element engaging position, and a key controlled bolt supported by said housing and adapted to project into said notch when the lever is raised from engagement with said elements.

5. In a motor car gear shift, a housing, spaced shift rods slidable thereon, gear shift lever engaging lugs fixed on said rods and provided with opposed recesses adapted to align when the gears are in neutral, a gear shift lever pivotally and slidably mounted on said housing, provided with a lower terminal, adapted to enter both of said recesses at once to prevent shifting of said rods, and provided with a reduced portion adjacent said terminal adapted to enter only one of said recesses at once to shift said rods, and spring-actuated means for securing said lever in an axial position in which said terminal portion engages the sides of both of said recesses.

6. The combination of gear shifting elements, a fixed housing, an element engaging shifting lever pivotally mounted on said housing and slidable upwardly to disengage from said elements, means tending to thrust said lever downwardly into element engaging position, and spring-actuated means supported on said housing, adapted to engage said lever when the latter is raised from engagement with said elements.

7. In a gear shift mechanism, a hollow spherical housing provided with a substantial opening, a washer seated on the interior of said housing and about said opening, a cap seated on the exterior of said housing and about said opening, a bushing extending through said washer, housing, and cap, fixed to the latter and engaging the lower face of said washer, a shift lever extending through said bushing and having a limited sliding movement therein, and a coiled spring compressed between the underface of said washer and the upper face of a projection on the lower part of said lever to thrust the latter downwardly and to eliminate play between the parts above the same.

8. In a gear shift mechanism, a hollow spherical housing provided with a substantial opening, a washer seated on the interior of said housing and about said opening, a cap seated on the exterior of said housing and about said opening, a bushing extending through said washer, housing, and cap, fixed to the latter and engaging the lower face of said washer, a shift lever extending through said bushing and having a limited sliding movement therein, and yielding means thrusting said lever downwardly.

9. In a gear shift locking device, a gear shift housing element, a lever carried by said element and movable axially into and out of position for operating the gear shift rods, a latch bolt lock unsecured to said element and freely slidable on said lever and adapted to be held by its bolt in position to lock the lever out of rod operating position.

In testimony whereof I hereunto affix my signature this 28th day of February, 1922.

JOHN WITTE.